F. C. OVERBURY.
MACHINE FOR MAKING SHINGLE STRIPS.
APPLICATION FILED SEPT. 7, 1915.

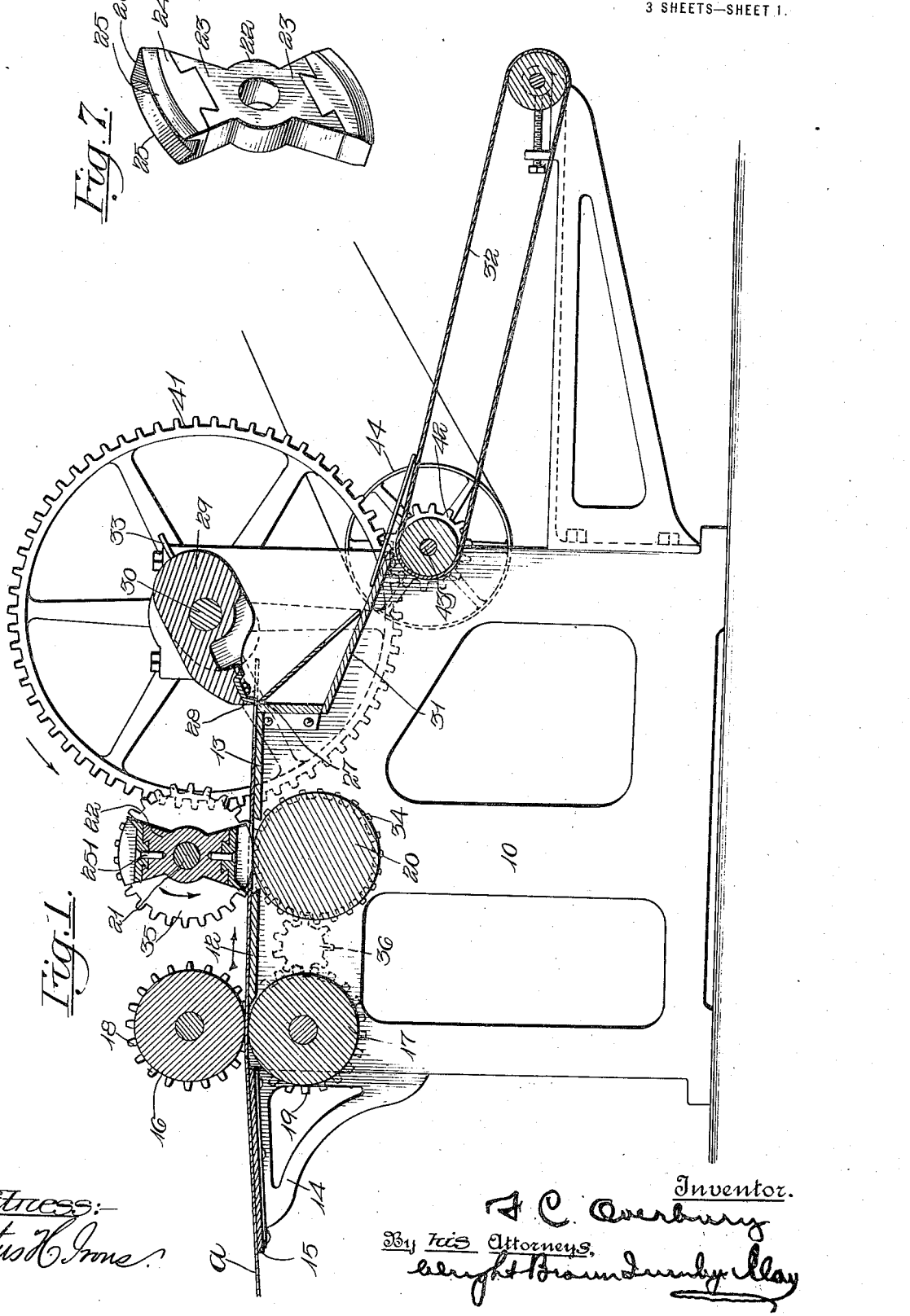

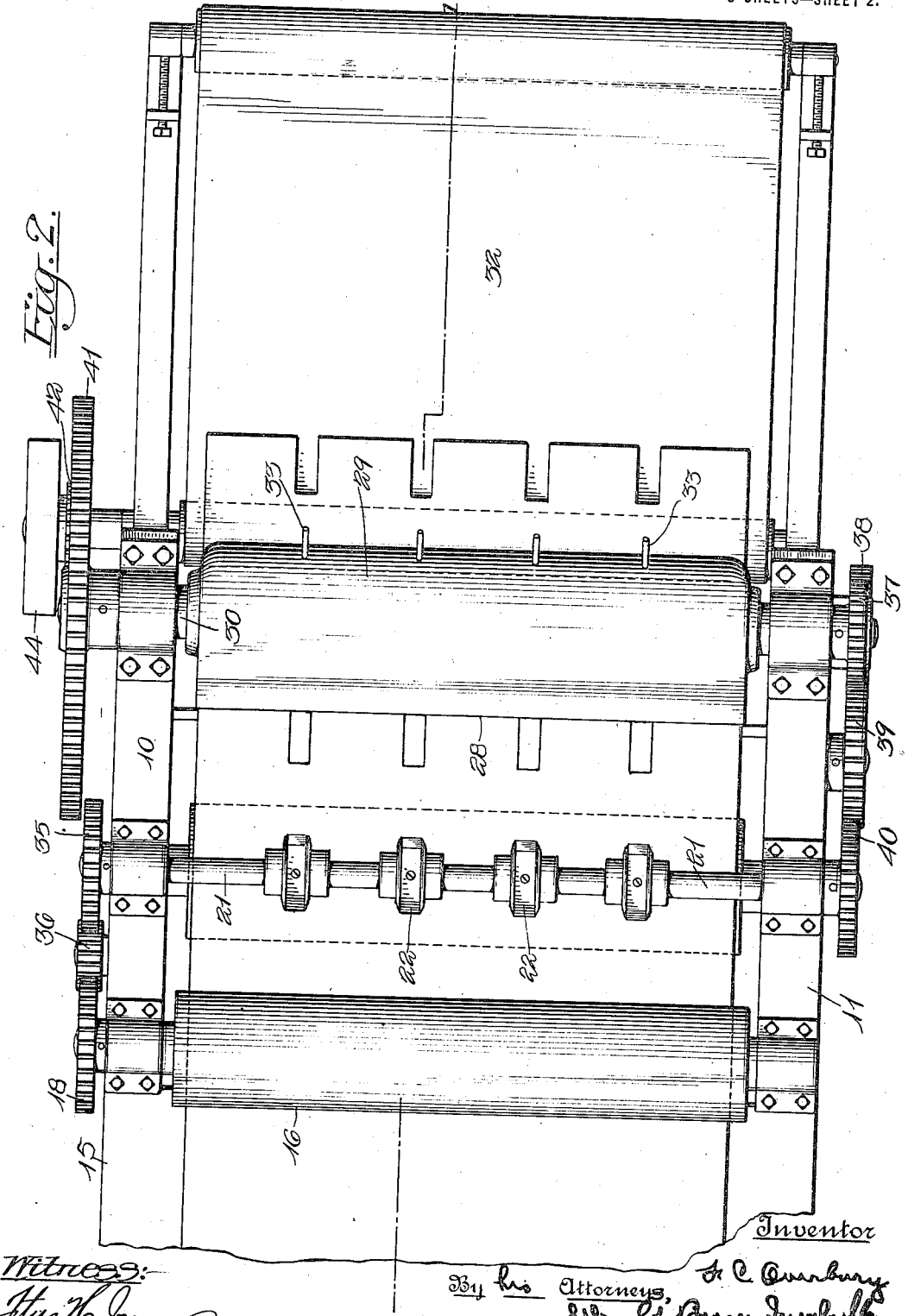

1,182,417.

Patented May 9, 1916.
3 SHEETS—SHEET 3.

Witness:
Inventor
F. C. Overbury
By his Attorneys

UNITED STATES PATENT OFFICE.

FREDERICK C. OVERBURY, OF HILLSDALE, NEW JERSEY, ASSIGNOR TO FLINTKOTE MANUFACTURING COMPANY, OF RUTHERFORD, NEW JERSEY, A CORPORATION OF NEW JERSEY.

MACHINE FOR MAKING SHINGLE-STRIPS.

1,182,417.   Specification of Letters Patent.   Patented May 9, 1916.

Application filed September 7, 1915. Serial No. 49,247.

*To all whom it may concern:*

Be it known that I, FREDERICK C. OVERBURY, a citizen of the United States, and a resident of Hillsdale, in the county of Bergen and State of New Jersey, have invented certain new and useful Improvements in Machines for Making Shingle - Strips, of which the following is a specification.

This invention has relation to machines for making roofing elements and has for its object to provide a machine for the manufacture of shingle strips from elongated sheets of flexible prepared roofing material, such for example, as shown in Letters Patent No. 1,150,298, dated August 17, 1915.

Figure 5:
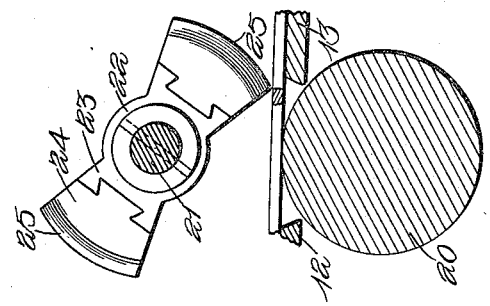
Figure 4:
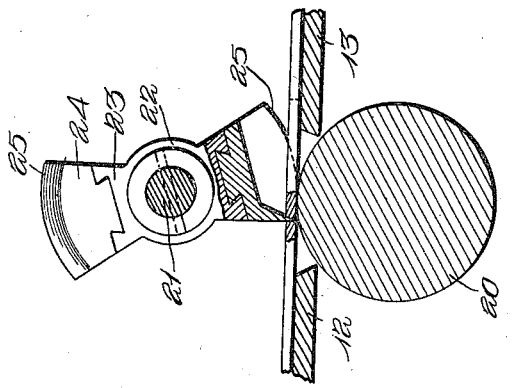
Figure 3:
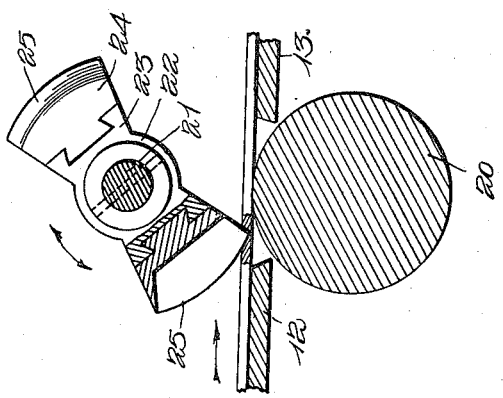
Figure 6:
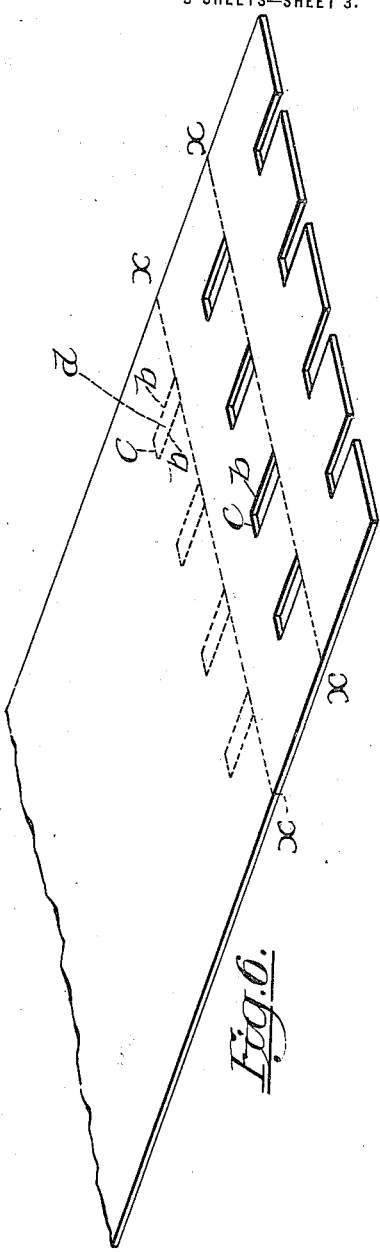

On the accompanying drawings,—Figure 1 shows in longitudinal vertical section a machine embodying my invention. Fig. 2 represents a plan view of the same. Figs. 3, 4 and 5 represent sections through the cutting rolls, and illustrate the operation on the work. Fig. 6 illustrates a sheet of roofing material and illustrates the results of the operations of the machine thereon. Fig. 7 represents in perspective view one of the cutters.

The material, upon which the machine is intended to operate, consists of an elongated sheet of roofing felt, *i. e.* felt or other equivalent fibrous material saturated or impregnated with asphalt or other waterproofing compound, and coated on one or both faces with hard pitch or asphalt, such as will withstand the action of the weather and will not be deleteriously affected by solar heat. Pigment may be incorporated in the coating to impart the desired color thereto, or crushed slate or other mineral may be embedded in the coating, if desired, so as to provide a mineral facing. Such sheets are furnished in various widths, and, by means of the machine to be described, they are severed transversely into shingle strips having spaced tabs or projections of predetermined shape or configuration. When said strips are laid in horizontal overlapping rows, the exposed tabs or projections simulate or present the appearance of shingles or tiles. Hence I term them " shingle strips."

Referring now to the drawings, the machine there shown may be provided with any suitable framework, as for example the side frames 10, 11. Between said frames are arranged the horizontal plates 12 and 13 to constitute a table for the support of the roofing material as it is fed through the machine. At the left end of the machine there are brackets 14 for supporting a plate 15 which constitutes an extension of the table.

The sheet *a* may be drawn from a roll or directly from the saturating, coating and surfacing machine, and travels in the direction of the arrow in Fig. 1. It is fed by the two feed or draw rolls 16, 17, one arranged above and the other below the table. Said rolls are mounted in suitable journal boxes, and are connected by the gears 18, 19. They extend across a sheet *a* of maximum width, the under roll 17 being arranged so that the plane of the table surface is tangential to the periphery thereof.

20 indicates a bed roll journaled in suitable bearings in the side frames. Above said roll, there is a shaft 21 on which are adjustably secured a plurality of cutting members 22, the function of which is to cut pairs of longitudinal slits and connecting cross slits in the sheet *a*. One of said members is shown in detail in Fig. 7. It consists of a hub having diametrical segments 23 projecting radially therefrom. Each segment has a transverse dovetail groove to receive a complemental tongue formed on the under side of a die 24. Screws 251 or other like fastenings may be used to prevent dislocation of the dies.

Each die has parallel segmental longitudinal cutting edges 25, 25, connected by a straight transverse cutting edge 26, which coöperate with the bed roll in cutting a pair of longitudinal slits *b* connected by a transverse slit *c* in the sheet *a*, as indicated in dotted lines in Fig. 6. This has the effect of forming a tongue *d*. The cutter members are rotated in the direction of the arrow in Fig. 3, and the dies are so arranged that the longitudinal slits are first formed, and then the cross slit, as a result of which the tongue is connected at its forward end to the body of the sheet, with its free end extending in a direction opposite to the direction of movement of the sheet. Since each cutting member has two dies, two sets of slits are cut in the body of the sheet *a* during one complete rotation of the shaft 21. As many cutting members may be strung on the shaft as desired and they may be spaced according to any requirements.

Beyond the cutting members and at the end of the table, I place a stationary shear blade 27 with which coöperates a movable shear blade 28 to sever the sheet *a* transversely along the dotted line *x—x* in Fig. 6, at the bases of the rows of tongues *d*. The movable blade 28 is secured upon a heavy rotatable member 29 mounted or formed on a shaft 30 which is journaled upon the side frame. The movements of the parts are all so coördinated and correlated that, as the sheet is fed through the machine, the transverse rows of pairs of connected slits are formed at the proper intervals in the sheet, and the sheet is severed in lines intersecting the forward ends of the slits, thereby producing shingle strips having a series of spaced tabs or projections. As the severed strips fall from the stationary shear blade, they are received on a slanting plate 31 and guided to an inclined conveyer 32 by which they are carried away to be assembled into packages.

The cut edges of the sheet are sticky and there is a tendency of the severed tongues to adhere in the slots caused by their formation, and hence, to insure their removal from the strips, I provide a series of devices for engaging them and thrusting them out of the end of the sheet before the next strip is severed. These devices may with convenience take the form of pins 33 set in holes in the chopper member 30 and alined with the dies. When a strip has been severed, and the sheet is being fed forward over the shear blade 27, as indicated in dotted lines in Fig. 1, the rotation of the member 30 causes the pins to engage the severed tongues and separate them from the advancing end of the sheet, as will be readily understood.

Those familiar with this art and acquainted with the difficulties in handling and cutting prepared roofing fabrics will appreciate the advantages which I secure by the use of the open end dies and the chopper in combination. Were the dies closed at both ends, the cuttings would enter and clog the hollow dies and render them useless. In my case, the hollow dies are closed by a cross blade at only one end, thus leaving the cutting attached to the sheet in the form of a tongue so that it cannot clog the die. Then the chopper subsequently severs the tongues from the sheet at the same time that it severs the strip.

Any suitable power-transmitting connections may be employed in connection with the instrumentalities I have described. For example, the bed roll 20 may be provided with a gear 34, intermeshing with a like gear 35 on the shaft 21, and also with an idler gear 36 in engagement with the gear 19 on the feed roll 17, in consequence of which the feed rolls, and the dies and bed roll will move in peripheral unison. The shaft 21 is driven from the shaft 30, by the gears 37, 38, 39 and 40, as shown in Fig. 2, said shaft 30 being also provided with a large gear 41 driven by a pinion 42 on a shaft 43 equipped with a belt pulley 44. The shaft 43 also serves to transmit power to the conveyer 32.

It is evident that, instead of locating the dies and bed roll between the feed rolls and the chopper, they may be placed to the left of the feed rolls if desired. I desire to have it understood that the hollow dies may be formed to give to the tabs or projections on the shingles any desired configuration or shape.

Having thus explained the nature of my said invention and described a way of making and using the same, although without attempting to set forth all of the forms in which it may be made or all of the modes of its use, what I claim is:

1. A machine for making shingle strips, comprising a bed roll, a series of revoluble hollow dies, each open at one end, for coöperating with said bed roll in slitting a sheet of roofing material, and a chopper arranged to sever the sheet on a transverse line intersecting the ends of said slits.

2. A machine for making shingle strips, comprising a bed roll, a series of revoluble hollow dies for coöperation with said bed roll to form pairs of connected longitudinal slits in a sheet of roofing material, each die having longitudinal blades and a transverse blade arranged at the ends of the first-mentioned blade, said die being open at the other ends of said longitudinal blades, and a chopper arranged to sever said sheet and to sever the tongues formed in the sheet by said dies.

3. In a machine of the character described, the combination with cutting means for forming transverse rows of tongues in a sheet of roofing material, of a chopper arranged to sever the tongues at their bases, and means for removing the severed tongues from the sheet.

4. In a machine of the character described, the combination with cutting means for forming transverse rows of tongues in a sheet of roofing material, of a chopper arranged to sever the sheet transversely on a line intersecting the bases of the tongues, and projections on the chopper for removing the severed tongues.

5. In a machine of the character described, the combination with cutting means for forming transverse rows of tongues in a sheet of roofing material, of a stationary blade, and a rotary member having a coöperating blade arranged to sever the sheet on a line intersecting the bases of the tongues, and projections on the rotary member for removing the severed tongues from the recesses in the sheet caused by the formation of the tongues.

6. In a machine of the character described, the combination with cutting means for forming transverse rows of longitudinal tongues each attached at one end to the body of the sheet, means for severing the sheet transversely on a line intersecting the bases of the tongues, and means for removing said tongues from the recesses in the sheet caused by the formation of said tongues.

In testimony whereof I have affixed my signature.

FREDERICK C. OVERBURY.